United States Patent
Kaye

[15] 3,663,302

[45] May 16, 1972

[54] BELLOW FOR RESERVE CELL

[72] Inventor: Gordon E. Kaye, 140 North Broadway, Irvington, N.Y. 10533

[22] Filed: Aug. 14, 1970

[21] Appl. No.: 63,725

[52] U.S. Cl. ................................................136/114, 136/90
[51] Int. Cl. .........................................................H01m 21/00
[58] Field of Search ...................................136/112–114, 90, 136/162, 166

[56] References Cited

UNITED STATES PATENTS

| | | | |
|---|---|---|---|
| 3,236,697 | 2/1966 | Amiet et al. | 136/162 |
| 2,624,767 | 1/1953 | Moulton | 136/113 |
| 3,173,811 | 3/1965 | Amiet | 136/90 |
| 3,445,295 | 5/1969 | Smith et al. | 136/90 |
| 2,783,291 | 2/1957 | Gold | 136/90 |

*Primary Examiner*—Anthony Skapars
*Attorney*—Robert Levine

[57] ABSTRACT

A reserve cell with indefinite shelf life, in which the structural elements, including the anode, cathode, separator and depolarizer are contained in an insulating housing and the electrolyte is contained in a compressible sealed vessel outside the housing and communicating with said housing, so the electrolyte is kept isolated from the cell until the cell is to be activated, at which time the seal is broken to enable the electrolyte to pass from the sealed vessel into the housing to assume operating position between anode and cathode and render the cell active.

6 Claims, 7 Drawing Figures

Patented May 16, 1972

INVENTOR
GORDON E. KAYE
BY
ATTORNEY

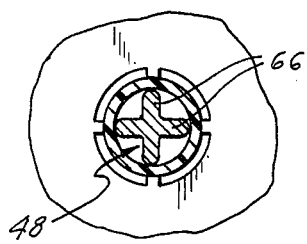
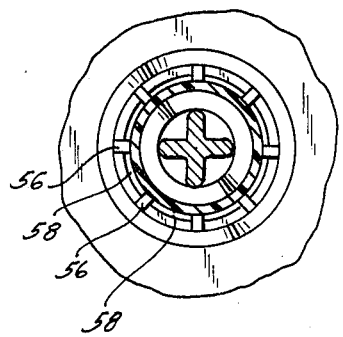
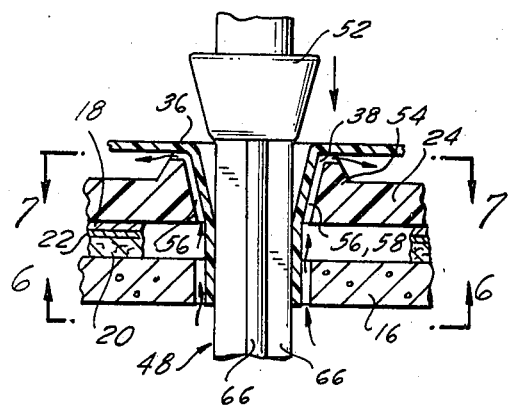
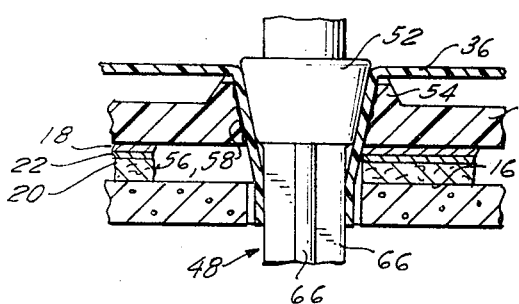
INVENTOR
GORDON E. KAYE
BY
ATTORNEY

BELLOW FOR RESERVE CELL

This invention relates to a reserve cell that is normally kept and stored in unactivated condition, by keeping the electrolyte isolated and separated from the anode and the cathode until there is a desire for utilization, at which time the cell is then put into activated condition by releasing the electrolyte from its isolated condition, usually in a separate closed container, and then permitting the electrolyte to enter the space between the anode and the cathode to serve as an active electrolyte to activate the cell.

In conventional cases where a battery cell is not immediately and currently active and is stored until it is desired to be used, the cell may not be called upon for use in service for substantial periods of time. In the meantime the cell is in an active state, and internal chemical action may proceed in a way to cause deterioration of the battery to such an extent as to render the battery ineffective, with less voltage and power capacity than is desired in a normal cell, even though the battery cell has not been used while standing idle.

The object of this invention is to provide a reserve battery cell which is normally kept inactive by keeping the electrolyte isolated in a container separated from the cathode-anode assembly until the battery cell is to be utilized, at which time the electrolyte from the isolated container is released and directed into the space between the cathode and the anode to provide an active ionizing and conducting medium.

Another object of the invention is to provide a reserve type cell in which the electrolyte is confined in a collapsible container, such as a sealed bellows, so long as the battery cell is not to be placed in use, and is stored in the bellows while awaiting use, at which time the bellows is compressed by a suitable activating device to break the seal of the bellows and to force the electrolyte from the bellows into the operating space of the cell between the cathode and the anode to render the cell activated and ready to deliver electrical energy.

A further object of the invention is to provide a reserve cell of the foregoing type which is constructed within a suitable insulating housing, and provided with a pair of plug terminals to permit the battery cell to function as a plug-in cell, and to be readily insertable into a pair of cooperating receiving terminals, to permit an electrical connection to be made simply, easily and readily to an electric circuit in which the energy from the battery cell is to be utilized.

In a preferred form of the invention a porous anode is formed as a frame surrounding an empty tetrahedral space with a bellows serving as a closed container for a volume of electrolyte, and arranged to communicate with said empty space in said anode through a normally sealed plastic transfer conduit, with a plug seal in said conduit arranged to be punctured by a suitable breaker rod to permit free passage of the electrolyte, stored in the extended bellows, to pass into empty space within the frame-shaped anode when the bellows is compressed and the breaker rod is simultaneously operated to puncture the seal in the conduit to the anode. That break in the conduit seal permits the electrolyte to pass out of the compressed bellows into the empty space within said anode frame. An absorbent material surrounds the porous anode frame; and in turn, the absorbent material is surrounded by a depolarizing material, in turn enclosed in a metallic element that constitutes the cathode of the cell. A housing of insulating material encloses the anode, the cathode and the empty space between them including the absorbent material and the depolarizing material. The housing has a top cover plate which serves to support the bellows coupled to a conduit passing through the cover plate into the anode frame. The coupling transfer conduit is normally closed by a sealing releasable plug or seat element which is arranged to be broken and pushed out of the way by a breaker push rod which permits the electrolyte to pass out from the compressed bellows into the space within the anode frame with a vent plug on the breaker rod which serves to re-seal the coupling conduit when the bellows is fully compressed and the breaker rod pressed home. In that position the vent plug on the breaker rod serves to reclose the conduit between the bellows and the anode, to prevent the electrolyte from spilling back out from the anode, the vent plug being shaped in a way to permit an air-venting action from the anode through the conduit and said outer cover until the vent plug is pressed home to close the conduit. An outer shell, that fits over the housing and serves as a protective cover over the top of the bellows that contains the electrolyte serves also as a manually actuable shell to compress the bellows and to force the breaker rod downward by the bellows to break the conduit seal loose to permit free passage of the electrolyte into the anode space.

The electrolyte seeps through the porous anode and into the porous spacer and depolarizer material, at the same time expelling any air through a small vent slot in the orifice in the cover plate, along the outer surface of the transfer conduit, into said outer shell and thence through a vent hole to ambient air.

The vent plug that re-seals the transfer conduit serves to slightly distort said plastic transfer conduit to reduce the size of said vent slot.

The details of construction of a battery cell of this invention and the manner of its operation to render the cell activated, from a normally inactivated condition, are described in the following specifications, taken in connection with the accompanying drawings, in which FIG. 1 is a perspective vertical sectional view of the upper part of a cell of this invention showing the expanded condition of the bellows containing the electrolyte while the cell is in its unactivated state;

FIG. 4 is a vertical sectional view of the transfer conduit disposed on its seat to illustrate the venting structure of the seat;

FIG. 5 is a transverse sectional view of the breaker rod and the transfer conduit, to show the fluted structure of the breaker rod to permit venting while the cell is being converted to its activated state.

Figure 1:
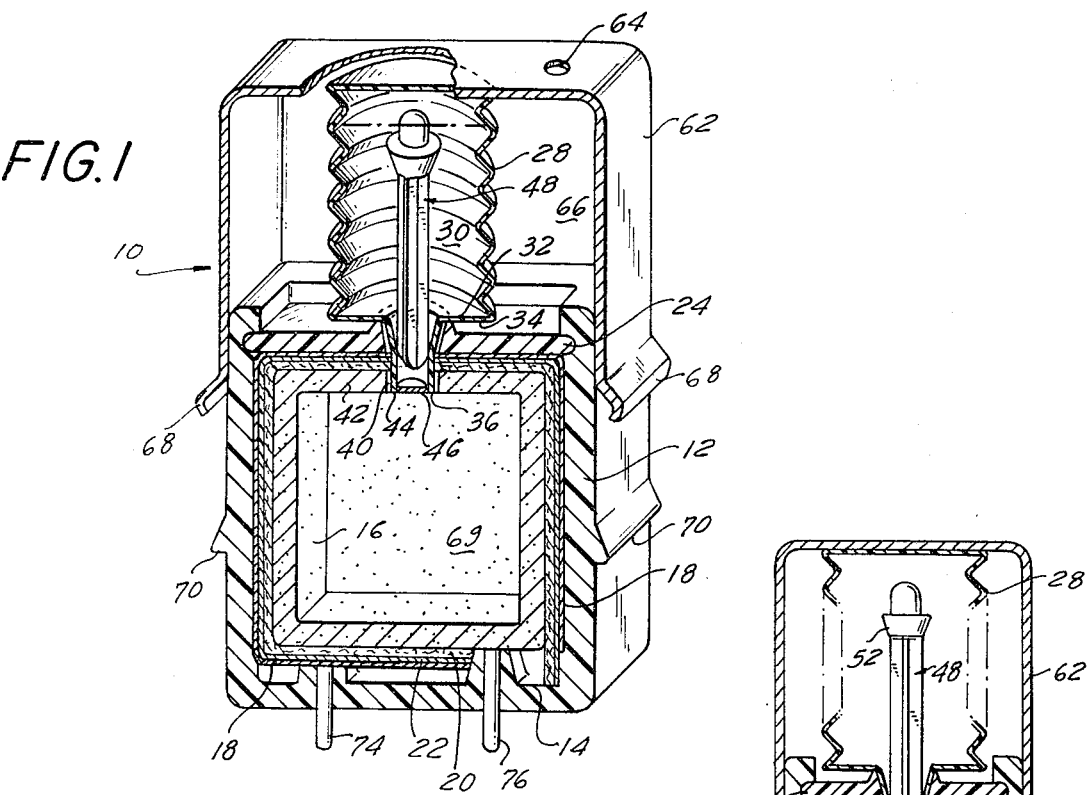

As shown in FIG. 1, a reserve type cell 10 is shown as embodying a plastic outer cell container or housing 12 having an inner chamber 14 in which are disposed a porous anode 16, a cathode 18, spaced from the anode 16 by an absorbent spacer 20, and by a depolarizing material 22. The chamber 14 in the cell container or housing 12 is closed by a plastic cover plate 24 closely fitted into the top end of the plastic cell or housing.

Normally, the space within the cell container 12 is dry and free of the electrolyte, so the cell remains in unactivated condition while it is in reserve and is not being put into use.

The electrolyte for the cell renders the cell active when introduced into the space between anode 16 and the cathode 18. Normally the electrolyte is kept in reserve in an expansible and contractible bellows 28, which is shown in its expanded condition in FIG. 1, filled with the electrolyte 30.

The bottom wall 32 of the bellows communicates with the upper open end 34 of a plastic transfer conduit 36 which extends through an opening in the cover plate 24 and through an aligned opening 40 in the top wall 42 of the anode 16. The lower or inner end 44 of the plastic transfer conduit 36 is closed by a hermetic button seal 46, which together with the closed conduit 36 provides a hermetical seal for the bellows 28 to retain the electrolyte in the bellows as long as the cell is not to be activated.

Activation of the cell is accomplished by fracturing the button seal 46, to permit the electrolyte to flow out and be expressed from the bellows by the compression of the bellows 28. The fracturing operation to open the button seal 46 is accomplished by a breaker rod 48 which is normally supported in raised position in the transfer conduit 36. When the cell is to be activated, the bellows 28 is compressed and operates to depress the breaker rod 48 to engage and fracture the button seal 46, to permit the electrolyte 30 to flow out of the bellows 28 and to be forced out of that bellows as the bellows is compressed.

Figure 2:
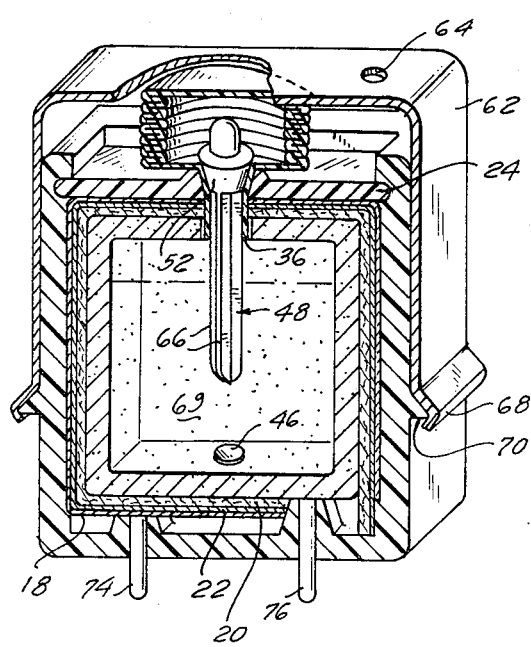
FIG. 2 is a view similar to FIG. 1 when the bellows is completely compressed to transfer the electrolyte to the cell to render the cell activated.
Figure 3:
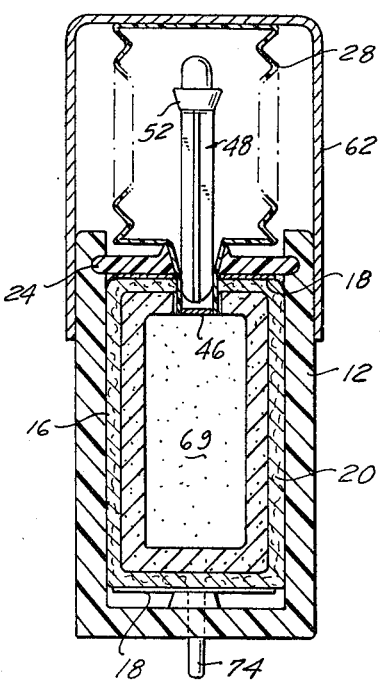
FIG. 3 is a perspective end sectional view of the cell.

As shown in FIG. 2, the bellows has been forced downward into its compressed state, and said breaker rod 48 is in its lower-most position, at which position a vent plug 52 at the top of the breaker rod 48 seats in the upper end of the transfer conduit 36 to accomplish a vent closing and sealing operation to prevent leakage of the electrolyte from the cell back up into the space above the cover plate 24.

The venting operation of the cell is illustrated in the several FIGS. 1, 3, 4 and 5. In FIG. 1, and as shown in more detail in FIG. 4, the opening 38 in the cover plate 24 is encircled by an upper hub portion 54 to serve as a tapered seat which is provided with longitudinal angularly spaced seating ribs 56, between which the spaces 58 provide venting passages for air, from the space around the anode within the cell container 12, to move out of the cell container when the electrolyte 30 is permitted to flow into the anode 16 and to continue through the porous anode 16 into the surrounding space. The air is vented out by, and to provide space for, the electrolyte, and to avoid any back pressure against movement of the electrolyte through the anode structure and into the surrounding space. The vent spaces 58 on the tapered seat permit the vented air to move out of the housing or cell container 12 into the space 60 around the bellows.

The compression of the bellows is accomplished by a compression or activating shell 62, which is disposed to fit slidingly and collapsingly on the body of the cell container 12. The shell 62 is provided with a vent hole 64 through which the air, present in or vented into space 60, may pass out into ambient space, to permit the activating shell 62 to be forced downward without cushioning restraint.

As the activating shell is compressed downward to compress the bellows 28 to the position shown in FIG. 2, the breaker rod 48 is also pressed downward to break the button seal 46, which then falls into the space within the anode, but since the button seal is made of plastic, it is inert to the electrolyte and does not interfere with the operation of the cell.

In order to provide for simple and rapid venting of the space within the anode structure, as the electrolyte enters the anode, the breaker rod 48 is provided with a shank 48A having a cross-section with a plurality of angularly spaced ribs 66, disposed lengthwise along the shank and shaped to provide fluted spaces 68, between said ribs 66, which serve as vent passages for the air to move out of the anode structure up to the venting chamber 60, from which the air is then permitted to move out into the ambient air through the vent hole 64 in the activating shell 62.

The breaker rod thus permits venting of the anode along the shank of the rod; and the vent spaces on the rib seat in the cover plate 24 permit venting of the space outside of the anode, while the breaker rod is being forced down into the anode and the electrolyte 30 is dispelling the air in the anode chamber 69; and the movement of the electrolyte through the porous anode expels the air out through the vent spaces 58 at the seat 38 in the cover plate 24. Once the electrolyte 30 has been introduced into the anode chamber and permitted to seep through into the surrounding space, all of the necessary venting will have been accomplished. It is desirable then to close the vents in order to assure no leakage of the electrolyte from the internal space of the cell. That is accomplished by a vent plug 52 on said breaker rod. First the vent plug moves down into the tapered portion of the plastic transfer conduit 36 and plugs the opening within that conduit to prevent return passage of the electrolyte 30 back into the bellows 28. At the same time, the plug 52 distorts and expands the plastic transfer conduit 36 to press that conduit against the plastic ribs 56 on the seat 38 in the plastic cover plate 24, thereby compressing the ribs 56 and forcing them into the intermediate vent spaces 58 to close those spaces against further venting, and to prevent seepage of the electrolyte from the anode-cathode chamber up into the space 60 in the activating shell 62.

In order to retain the bellows in compressed condition, and also to hold the breaker rod 48 in depressed position, the activating shell 62 is provided with gripping fingers 68 at its lower end, that are arranged to slide over and then under-grip detents 70 disposed on the outer surface of the insulating housing and container 12.

In order to permit easy simple electrical connection of the cell into an external circuit, the cell is constructed as an electrical plug device with two prong terminals 74 and 76, respectively connected to the cathode and the anode elements of the cell, while the prongs are insulatingly supported in and extend through the insulating material of the housing or cell container 12. This construction of the cell permits the cell to be inserted in appropriate receiving receptacle terminals, while in its unactivated state, and will thus remain in unactivated condition until the operational use of the cell is desired, at which time the manual compression of the activating shell 62 fractures the hermetic seal of the bellows system and permits the electrolyte to flow or be expressed into the battery cell system to activate the cell.

One of the primary features of a reserve cell of this type is to keep the electrolyte out of the operating zone of the cell until use of the cell is desired, and then, at that time, to introduce the electrolyte into the active zone of the cell, in order to activate the cell. There are also other important features that an ideal reserve cell of this type should have, and which the cell disclosed herein does have, when the inactive cell is converted to its active state by such introduction of the electrolyte into the operating region of the cell.

One desirable feature is that the cell should be activated and rendered operative as quickly as possible, and, second, that such activation should be effected quickly over or throughout the entire region of the cell. The feature of quick conversion to an activated condition is particularly desirable where the need for use of the reserve cell is caused by an emergency condition, such as when a main power source becomes inoperative or unavailable.

The second feature referred to is desirable in order to render all of the surfaces of the components of the cell in respectively uniform condition with respect to the normal operating condition of such surfaces of the cell, so that there will be no localized chemical interaction because of different chemical conditions on adjacent areas of the surfaces of the components in the cell resulting from slow and gradual activation in different regions of the operating zone of the cell.

Various modifications may be made in the structural design and arrangement of the components of the cell without departing from the spirit and scope of the invention as defined in the claims.

What is claimed is:

1. A reserve cell comprising an anode, in the form of a hollow body with porous enclosure walls;

an absorbant spacer material, engaging the outer surface of said anode;

a depolarizer material, engaging said spacer;

a cathode, engaging the outer surface of the depolarizer material;

an insulating housing, enclosing said cathode, depolarizer, spacer and anode and having an orifice for accommodating a transfer conduit;

a bellows, initially in expanded condition, serving as a static container for a volume of electrolyte; and operable to compressed condition to express the electrolyte into a predesigned path;

a transfer conduit, constituting a transfer coupling between said bellows and said anode and including a fracturable seal, effective to confine the electrolyte normally to the bellows in said initial condition, said conduit extending through a tapered opening in said housing and thence through an orifice in said anode wall and into the inner space within said anode;

a breaker rod, enclosed within said bellows and operable by said bellows, upon compression of said bellows, to extend into said transfer conduit and to fracture said seal in said conduit to permit the electrolyte to flow into said anode, said rod having a shank with longitudinal radial ribs and intermediate fluted spaces to slide freely in said conduit and to permit free flow of the electrolyte into said anode, along said shank and in said fluted spaces after the seal is broken by said rod and as said rod moves forward into said conduit as the bellows is compressed.

2. A reserve cell, as in claim 1, in which
said conduit has one end hermetically sealed to the static end of said bellows and is tapered at one end to seat on a tapered seat in said tapered opening in the top wall of said insulating housing;
said tapered opening in said top wall of said insulating housing having thin ribs longitudinally along said tapered opening to constitute said seat for the tapered end of said conduit, and to provide the spaces along said ribs to serve as vents from the space around said anode as the electrolyte moves through said porous anode into said space;
and a tapered plug adjacent the back end of the breaker rod for pressing the tapered back end of the conduit radially outward to deform and press said thin ribs of said seat to substantially close said tapered opening and limit or close said vent spaces when the breaker rod is pressed home by the fully compressed bellows in transferring said electrolyte to said bellows.

3. A reserve cell, as in claim 1, comprising
a pair of prong-type terminals extending through the insulating housing and electrically connected to said anode and to said cathode respectively, to permit simple insertion of said cell into a suitable external receptacle for connection into an external electrical circuit.

4. A reserve cell, as in claim 1, in which
said bellows has a static end and a free outer movable end, and the static end rests on end wall of said insulating housing, and said free outer movable end of said bellows is normally spaced from said end wall of said housing;
and an outer shell cap fits over said insulating housing covering and engaging said free outer movable end of said bellows, to cover and protect said bellows from external shock so long as the cell is to remain unactivated, and said shell cap serving to be manually actuable to compress said bellows to render said cell activated.

5. A reserve cell, as in claim 4, in which
said insulating housing embodies means for holding said outer shell cap in actuated position to hold the bellows compressed in cell-activating position, after said bellows has been compressed to activate the cell.

6. A reserve cell, as in claim 5, in which
said outer shell cap embodies anchoring means for holding said shell cap in actuated position on said housing.

* * * * *